United States Patent [19]
Bodkin

[11] Patent Number: 5,353,185
[45] Date of Patent: Oct. 4, 1994

[54] IMMERSION DETECTION CIRCUIT INTERRUPTER

[75] Inventor: Lawrence E. Bodkin, Jacksonville, Fla.

[73] Assignee: Rocom Electric Co. Ltd., Hong Kong, Hong Kong

[21] Appl. No.: 817,054

[22] Filed: Jan. 6, 1992

[51] Int. Cl.$^5$ ............................................. H02H 3/16
[52] U.S. Cl. ...................................... 361/49; 361/42; 307/326
[58] Field of Search ............................ 361/1–3, 361/5, 8, 42–50, 54, 55, 57, 104, 115; 307/326

[56] References Cited

U.S. PATENT DOCUMENTS 4,550,358 10/1985 Crowley et al. ............... 361/42
5,159,517 10/1992 Bodkin ......................... 361/49

*Primary Examiner*—Marc S. Hoff
*Assistant Examiner*—Ronald W. Leja
*Attorney, Agent, or Firm*—Arthur G. Yeager

[57] ABSTRACT

A sensing conductor (62) within an appliance housing (56) and a detection circuit (59, 60, 61, 63) preferably within the housing, cause a low resistance shorting of an appliance circuit (57, 58) in response to immersion in water, and an interrupter device (4, 5, 6, 27), preferably located in the plug (65) of the cord set, reacts to the resulting overcurrent by opening two fuses, one in each side of the line (2, 16; 3, 17). An overcurrent opens one fast acting fuse link (27) in the normally ungrounded side of the line (3, 17) and such fuse link (5) in the normally grounded neutral side of the line (2, 16). The fuse link (27) is directly assisted in opening by a spring element (4) so as to have a slight precedence in opening, over fuse link (5) which is indirectly assisted in opening by spring (4), through an insulating coupling block (6), to achieve an initially sequential but substantially overlapping and simultaneous opening, thus disconnecting both sides of the line.

20 Claims, 3 Drawing Sheets

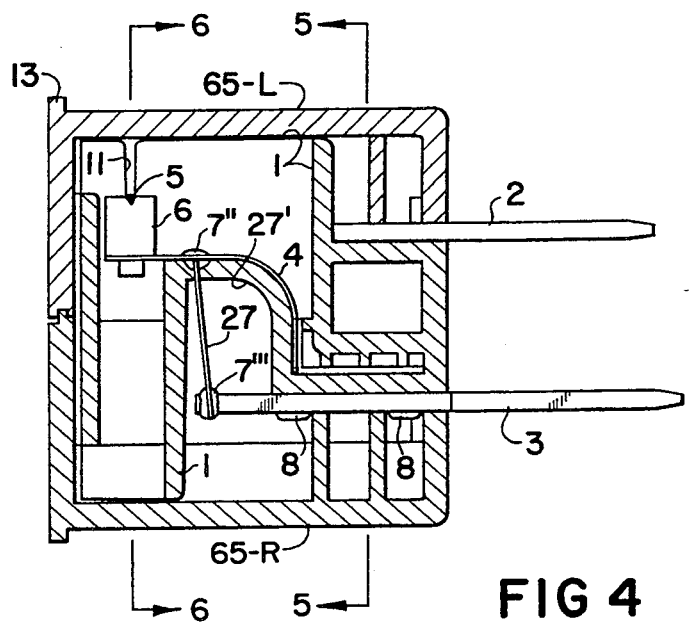
FIG 4
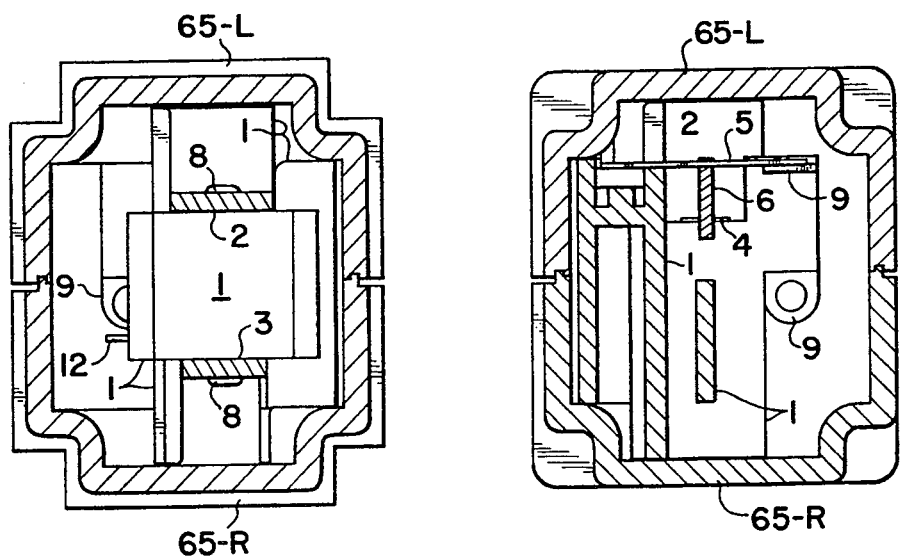
FIG 5
FIG 6
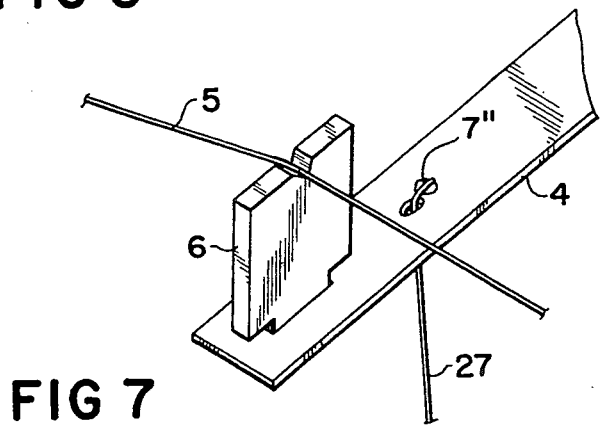
FIG 7

5,353,185

IMMERSION DETECTION CIRCUIT INTERRUPTER

TECHNICAL FIELD OF THE INVENTION

This invention relates to a device that protects against electric shock when an appliance is accidentally immersed in water or other electrically conductive liquid.

BACKGROUND OF THE INVENTION

Increasing requirements for including an effective means of electrical shock protection in the design of appliances has created an industry focus on ways and means of achieving it at acceptable cost.

Since conditions of greatest electrical shock hazard have been generally established to exist wherever appliances are used around water, and more particularly under conditions affording immersion, such as the bathroom, relatively simple devices specifically offering immersion protection could provide shock protection in a majority of hazardous instances and can normally be produced at lower cost than ground fault circuit interrupters or my own Universal Fault Circuit Interrupters (see U.S. Pat. Nos. 3,997,818 and 4,707,759) which are designed to protect under a broader spectrum of hazardous conditions. It is believed that the present invention can be made at lower cost than any other known Immersion Detection Circuit Interrupter (I.D.C.I.), without sacrificing reliability, even less than the I.D.C.I. described in my prior pending U.S. application Ser. No. 07/554,714 filed Jul. 17, 1990, now U.S. Pat. No. 5,159,517, dated Oct. 27, 1992. The expense of electromagnetic switching devices and load current carrying contacts are avoided and where solid state devices are employed, their closed mode of failure is made to represent a positive fail-safe factor rather than a negative consideration.

BRIEF SUMMARY OF THE INVENTION

In one aspect, this invention is seen to comprise a power circuit having at least two conductors for conducting electrical power from a line source to an appliance circuit, within an appliance housing, and having an electrical shock protection device. The device includes an automatic means connected to the conductors to initiate an overcurrent in response to an immersion of the appliance circuit in water or other conductive liquid. The power circuit also includes interrupting means, in at least two of the conductors, that is responsive to the overcurrent to open the conductors and interrupt the power circuit in event of such immersion, and such opening occurs in a substantially concurrent manner. In other aspects, the automatic means employed to initiate the overcurrent includes a sensing conductor and immersion detection circuit. The automatic means provides the overcurrent by establishing a short or low resistance shunting of the appliance circuit. The interrupting means in the conductors includes a fuse link in at least two of the at least; two conductors.

Preferably, the interrupting means includes a pair of fast acting fuse links, one in series with the appliance load on the ungrounded side of the power circuit, and another, also in series with the appliance load, on the grounded neutral side of power circuit.

Preferably, the fuse links have substantially equal ratings. Due to their connection in series with the load, each fuse link passes the same amount of load current, or overcurrent, in the event of a short circuit that by-passes the load, such as can be initiated and established by the sensor circuit, in response to an immersion condition in the appliance. While overcurrent heating brings such equally rated fuses to a nearly equal point of opening, at approximately the same time, an early opening of one can relieve arid protect the other. For this reason, a mechanical coupling of insulative material, carried by a flexed strip of spring material acts to assure the opening of both fuse links and at substantially the same time.

An object of this invention is to provide an especially rapid immersion detection and power interrupting shock protective response by means of a device that can be made an integral part of appliance design.

Another object is to provide an improved immersion detection circuit interrupter (IDCI) that can be produced at minimal cost in order to make such integral shock protection, in the event of immersion, more generally acceptable to the maker, seller and purchaser.

Still another object is to provide a circuit interrupter in a compact package, so that design factors will not be a reasonable argument against acceptance of its integral shock protection by maker, seller or purchaser.

An additional object is to provide an immersion detection circuit interrupter that will function over a wide range of input voltages and frequencies so that the same type of device may enjoy wider usage.

A further object is to provide an immersion detection circuit interrupter device that is not reduced in protective function if the plug of the cord set is inserted into a receptacle outlet having its ungrounded and grounded neutral connections reversed.

A still further object is to provide an immersion detection circuit interrupter that is resistive to the effects of both physical abuse and transient electrical conditions that might cause an unwarranted power interruption.

One more object is to provide an immersion detection circuit interrupter with a mode of failure that leaves an appliance safe to handle.

After being tripped by an immersion condition, another object is to provide a feature that tends to prevent reuse of the protected appliance since immersion conditions can affect its normal functioning and compromise the effectiveness of other safety devices, such as thermostats.

An additional advantage is protection against short circuits of a more conventional origin and having a source other than the immersion detection module. In this sense, the interrupter plug can serve as a fused plug that will open both sides of the line.

BRIEF DESCRIPTION OF THE DRAWINGS

FIG. 4 shows a cross-sectional view of the plug assembly taken along line A—A of FIG. 2.

FIG. 5 and FIG. 6 show cross-sectional views of the plug assembly respectively taken along lines B—B and C—C of FIG. 4; and FIG. 7 is a detailed illustration depicting the fuse links and the forces exerted thereon by the spring strip.

DETAILED DESCRIPTION OF THE INVENTION

Figure 1:
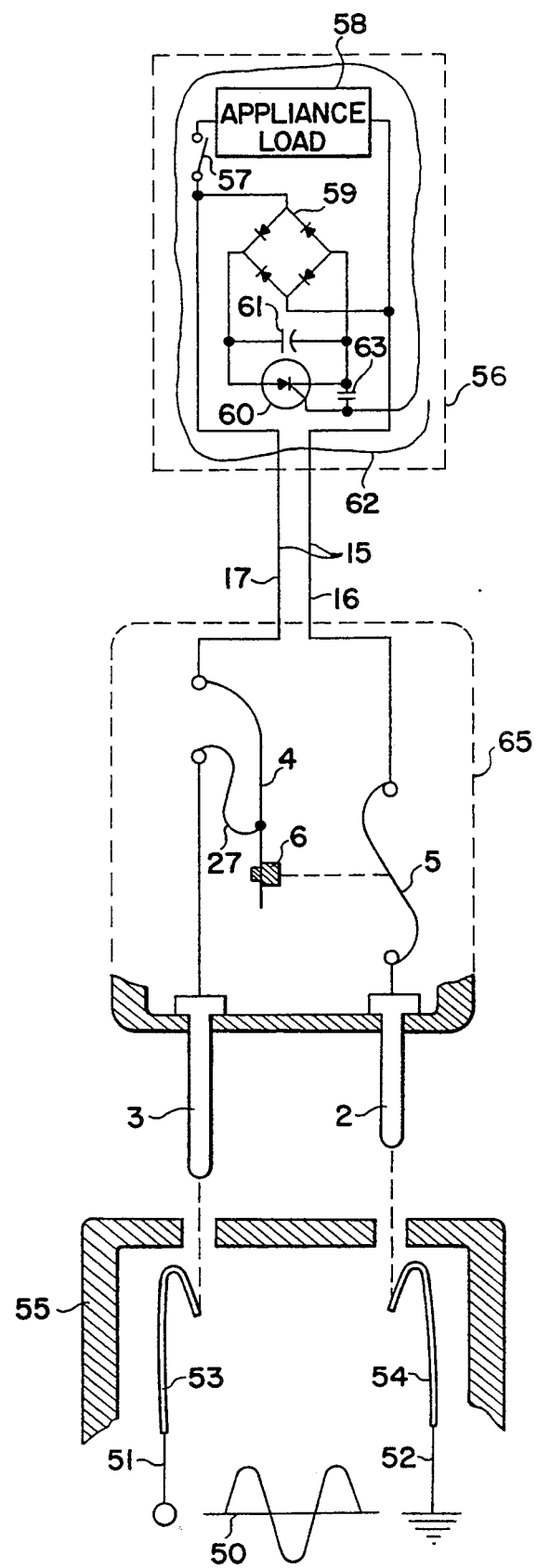
FIG. 1 is a schematic diagram showing the sensor conductor and the immersion detection circuit located in the appliance housing as part of the appliance circuit and the interrupting device located in the plug assembly.

Referring first to the schematic diagram of FIG. 1, it may be seen that power is supplied from line source 50 through ungrounded conductor 51 and grounded neutral conductor 52 and their respective receptacle terminals 53 and 54 to respective plug blades 3 and 2. From ungrounded plug blade 3 to the appliance load 58 contained in appliance Housing 56, the current path may be seen to include a fuse link 27, a conductive spring support strip 4 to which the link 27 is attached, conductor 17 of line cord 15 and appliance switch 57. From grounded neutral plug blade 2 the current path to the appliance load 58 may be seen to include a second fuse link 5, which is mechanically coupled to the spring strip 4 by insulating block 6. The path continues from fuse link 5 to appliance load 58 through conductor 16 of line cord 15. The detection circuit in FIG. 1 includes a full-wave rectifier 59 which has its a.c. input terminals connected across conductors 16 and 17 so as to be connected in parallel with appliance load 58 together with its controlling switch 57.

Thyristor 60, shown as a silicon controlled rectifier (SCR), is connected across the output terminals of full-wave rectifier 59 so as to pass output current from the rectifier 59 when triggered and placed in a forward conductive state. The full-wave rectifier 59 together with the thyristor 60 will thus pass current in either direction between ungrounded conductor 17 and grounded neutral conductor 16 to shunt or divert current away from appliance load 58 and its switch 57, to short circuit the power path and create an overcurrent which opens fuse links 27 and 5 of the interrupter and breaks the electrical connection of the appliance to both the ungrounded and grounded neutral sides of the line source 51 and 52.

Triggering of the thyristor 60, by immersion, is accomplished through sensor conductor 62 which is connected to the gate of the thyristor. When a small current is caused to pass between the sensor conductor 62 and current carrying parts of the appliance or between the sensor conductor 62 and earth ground, as by the connecting contact of water or other conductive medium, the thyristor 60 is triggered and creates the short circuit of the power circuit that activates the interrupter within the plug housing 65.

Capacitor 61 is connected in parallel with thyristor 60 as a primary means of inhibiting unwarranted triggering of the thyristor by line transients such as voltage spikes, supplying a small forward conditioning current. It is connected in a filter capacitor position but employs values far lower than those generally used for filtering purposes. A value of 1.0 mfd is sufficient with some of the thyristors and values above 2.0 mfd are generally not desirable due to size which can make inclusion in the appliance housing more difficult. However, larger values, such as 10 mfd are often needed to, compensate for thyristor variations and to assure triggering resistance to higher voltage spikes of 3 kilovolts or more. Another method of inhibiting unwarranted triggering due to switching spikes including those caused when the plug is inserted in the receptacle outlet, involves plug blade structure and will be discussed hereinafter.

Selection of gate sensitivity is also of prime importance in the avoidance of unwarranted triggering of thyristor 60. The Igt should be in excess of 200 microamperes and preferably above 2 milliamperes, but should respond quickly to less than 6 milliamperes, so as to meet standards of sensitivity.

A smaller capacitor, 0.033 to 0.1 mfd is connected between the gate and the cathode of the thyristor 60 to stabilize the sensor and make it more resistant to triggering by static charges.

Where especially compact circuits are desired the thyristor is typically a 0.8 ampere SCR in a TO-92 package with an insensitive gate. Such insensitive gates are achieved by including a resistance coupling between the gate and cathode in the semiconductor chip. This eliminates the need for an external resistance which would enlarge the construction of the sensor module. While rectifier package 59 and SCR 60 should be considered sacrificial, the fast fuse action may sometimes permit the rectifier to survive.

Figure 2:
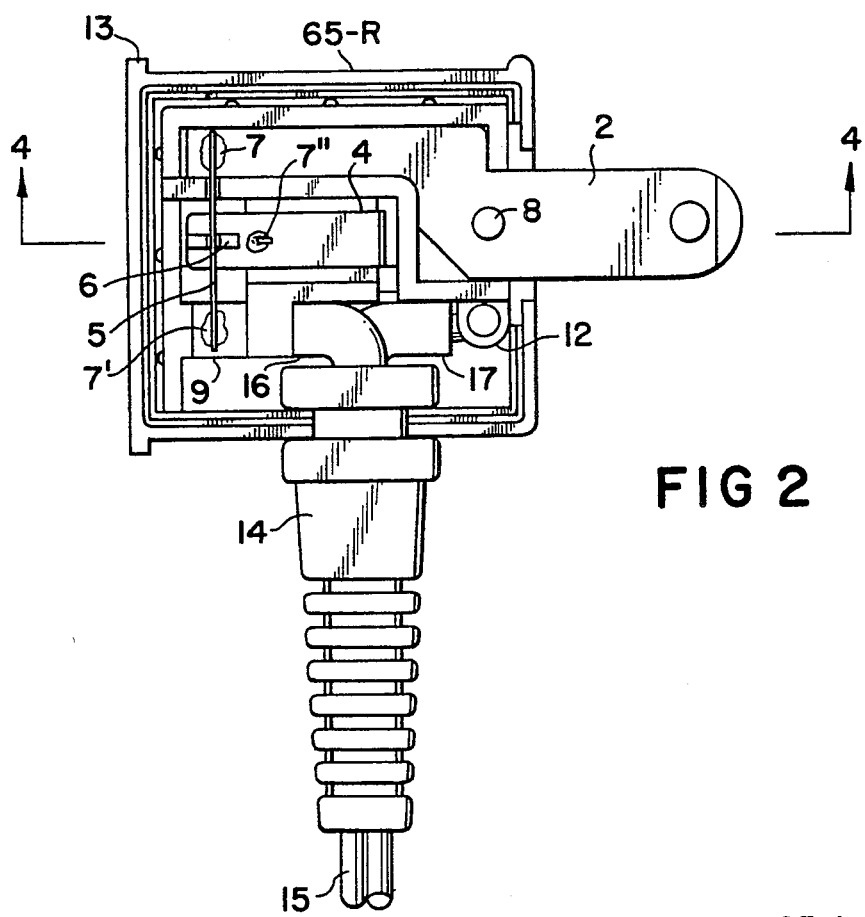
FIG. 2 is a side elevational view of the plug assembly as viewed from the open side when the left half of the plug housing has been removed.

Referring now to FIG. 2, the inside of the plug assembly is shown with the left half of the housing (65-L) removed. This reveals the internal shape of grounded neutral plug blade 2, secured by a molded stud with heat formed head 8, and the fuse link 5 is secured at one end, near the internal end of blade 2, by solder pool 7, and at the other end, by solder pool 7' to connector 9, passing over, and in contact with the coupling 6 which is carried by spring strip 4. One end of fuse link 27 passes through a hole in strip 4 and is secured by solder pool 7''. Conductors 16 and 17 from line cord 15 pass into the plug housing 65 through strain relief 14 and connected to connectors 9 and 12 respectively. Connector 12 is joined to spring strip 4.

Figure 3:
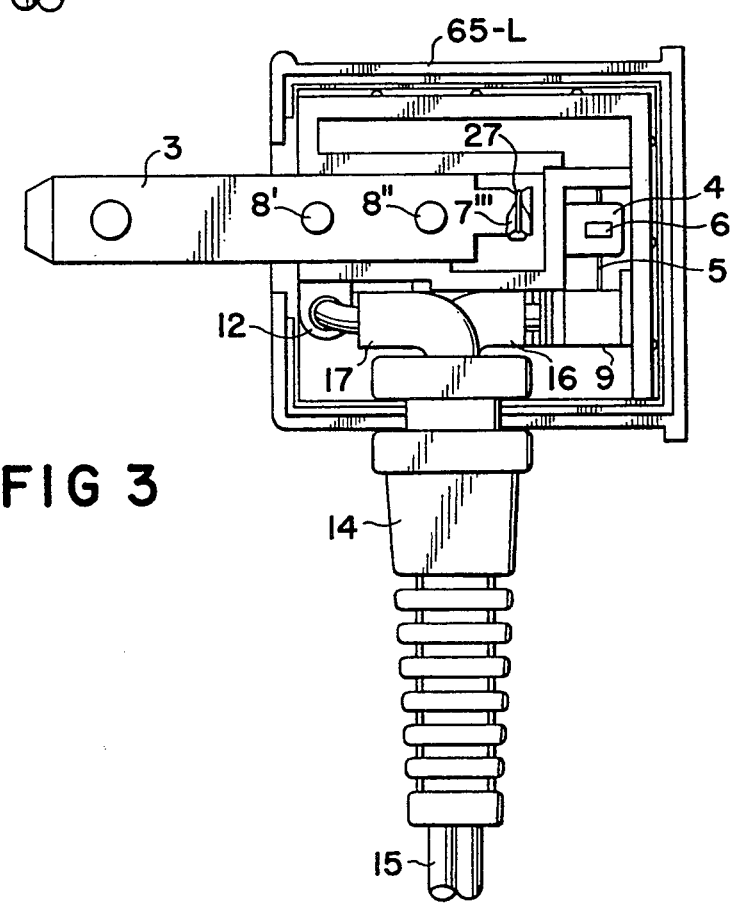
FIG. 3 is a side elevational view of the plug assembly as when the right half of the plug housing has been removed.

Referring now to FIG. 3, the inside of the plug assembly is shown with the right half of the housing (65-R) removed. In this view, the ungrounded plug blade 3 is secured by molded studs with heat formed heads 8' and 8''. The other end of fuse element 27 is secured near the internal end of blade 3 by solder pool 7'''. The connection of line cord conductor 17 to connector 12 is more clearly shown and is electrically and mechanically joined to spring strip 4. Also, the smaller end of coupling block 6 that passes through a slot in spring strip 4 is shown. Referring now to FIGS. 4–6 the structure of the insert body 1 is shown and the fuse link 27 passes through a fuse chamber 27'. Link 27 is fastened at one end to spring strip 4, in a solder pool 7'', and at the other end, near the internal end of plug blade 3, in another solder pool 7''''. Fuse link 5 passes through slot 11 in insert body 1 and is secured at one end, near the internal end of grounded neutral blade 2, in a solder pool 7, and on connector 9 by another solder pool 7'. Fuse link 27 is linearly stressed or forced by flexed strip 4 which also applies a transverse pressure or force to fuse link 5 through coupling block 6 that contacts link 5, at or near the center of its length.

Links 27 and 5 both effectively retain strip 4 in its flexed condition and relaxation of tension in either of links 27 and 5 tends to increase tension in the other. If link 27 stretches a given amount, strip 4 tends to move an equal amount, but because of the transverse coupling to link 5, the motion will tend to cause a lesser stretching of link 5, thus allowing link 27 to initiate rupture in the opening of the fuses upon overcurrent. As fuse link 27 opens all of the stressing force applied to it is released and added to that already being applied to link 5. Link 5 is already in a rupture ready state, having been subjected to the same overcurrent as link 27, and its opening time overlaps that of link 27, so that opening is substantially simultaneous. FIG. 7 illustrates and clarifies the functional relationship of fuse links 27 and 5 as they are mutually stressed or forced by spring strip 4. The conductive spring strip 4 is directly connected to link 27 to which it applies a tensile strain or force in the direction of its length. Tensile strain is developed in link 5 by strip 4, but less directly, by application of pressure at right angles to the direction of the fuse length, through coupling block 6.

In assembly, fuse link 27 is not soldered to plug blade 3 until spring strip 4 has been positioned against the top of the fuse compartment, and fuse link 27 has been pulled with enough tension to eliminate a curvature.

Close attention should be given to design of the interrupter body 1 to assure that the fuse link 27 is well contained in a shielded and insulated compartment 27' that can also safely direct any escaping material, since the metal and carbon particles may be deposited on the internal surfaces of housing 65-L and 65-R and insert body 1 to form current paths between conductors. While these paths typically have a high resistance they are to be avoided. Strong arcing may develop between elements of opposite polarity when they are assisted by the vaporizing metal, especially if short paths are made available.

The movable components, spring strip 4 and block 6, which could transmit a mechanical shock stress to fuse links 27 and 5, have low inertial qualities that contribute greatly to the interrupter's resistance to premature rupture of the fuse links that might be caused by such abuses as dropping on hard surfaces.

It will be noted that there is a flange 13 at the back of the plug housing 65 that enhances the user's grasp in removing the plug from a receptacle outlet.

As can be seen from FIGS. 1–4, the plug blades are of unequal length, a simple cost-free modification that appears to be quite useful, in conjunction with sensor circuitry, in reducing the effect of switching spikes which can be created when the plug is inserted in a receptacle outlet. This is discussed in more detail in U.S. application Ser. No. 07/554,714. Both plug blades are within length requirements. The longer blade 3 is just below the maximum allowable length and permits capacitor 61 to obtain a small charge through the earth ground capacitance effect just prior to the contact of the shorter blade 2, which is just above the minimum allowable length, to complete the power circuit.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a power circuit including at least two conductors for conducting electrical power from a line source to an appliance circuit, within a housing, and having an electrical shock protection device, including a sensor and having automatic means connected to said conductors to initiate an overcurrent in response to an immersion of the appliance circuit in water or other conductive liquid, and further including an interrupting means, the improvement in which said interrupting means comprises at least two fuse links respectively in said at least two conductors, and force means for opening both of said fuse links in a substantially concurrent manner when the overcurrent is initiated to disconnect said appliance circuit from the line source.

2. The power circuit as defined in claim 1 in which said force means includes a mechanical coupling means to aid in achieving a substantially concurrent opening of both of said fuse links upon said overcurrent.

3. The power circuit as defined in claim 2 in which said mechanical coupling means includes means to apply mechanical force to at least one of said fuse links.

4. The power circuit as defined in claim 3 in which said means to apply mechanical force, applies such force through said mechanical coupling means.

5. The power circuit as defined in claim 3 in which said means to apply mechanical force, applies force to each of said fuse links.

6. The power circuit as defined in claim 3 in which said means to apply mechanical force, applies a Predetermined force to one of said fuse links and another force greater than said predetermined force to another of said fuse links.

7. The power circuit as defined in claim 4, in which said means to apply mechanical force includes a flexed spring.

8. The power circuit as defined in claim 7, in which said flexed spring is conductive and is directly connected to one of said at least two fuse links, while being indirectly connected to another of said at least two fuse links by said mechanical coupling means.

9. The power circuit as defined in claim 8 in which said mechanical coupling means includes an electrically insulating material.

10. The power circuit as defined in claim 9 in which said at least two fuse links are elongated and each has an elongated axis in which said axes are arranged at an angle to each other.

11. The power circuit as defined in claim 10 further comprising an electrical plug connected to said at least two conductors, said at least two fuse links being located in said plug.

12. The power circuit as defined in claim 1 further comprising an electrical plug connected to said at least two conductors, said at least two fuse links being located in said plug.

13. The power circuit of claim 1 wherein said automatic means includes a capacitor greater than 2.0 mfd to inhibit actuation of said automatic means other than immersion of the appliance circuit.

14. The power circuit of claim 13 wherein said automatic means includes a thyristor in parallel with said capacitor.

15. The power circuit of claim 1 further comprising an electrical plug having a casing, said at least two fuse links being located within said plug casing, said automatic means being located within said housing.

16. In a power circuit including only two conductors for conducting electrical power from a line source to an appliance circuit within an appliance housing, the power circuit having an electrical shock protection device including a sensor and an automatic means connected to the two conductors to initiate an overcurrent in response to an immersion of the appliance circuit in water or other conductive liquid, the power circuit further including an interrupting means, the improvement in which said interrupting means comprises only two fuse links being respectively in series with said two conductors, and force means for opening both of said fuse links in a substantially concurrent manner when the overcurrent is initiated to disconnect said appliance circuit from the line source, an electrical plug having a casing and being connected to said two conductors, said two fuse links being located within said casing, said automatic means being located within said housing.

17. The power circuit as defined in claim 16 in which said force means includes a mechanical coupling means to aid in achieving a substantially concurrent opening of both of said fuse links upon said overcurrent.

18. The power circuit as defined in claim 17 in which said mechanical coupling means includes means to apply mechanical force to at least one of said fuse links.

19. The power circuit as defined in claim 18 in which said means to apply mechanical force, applies a predetermined force to one of said fuse links and another force greater than said predetermined force to another of said fuse links.

20. The power circuit of claim 16 in which said force means applies unequal effective forces to said fuse links.

* * * * *